United States Patent [19]

Lee

[11] 4,363,055
[45] Dec. 7, 1982

[54] CONTROL SYSTEM FOR AUDIO-VISUAL PROJECTOR

[75] Inventor: Michael G. Lee, Redmond, Wash.

[73] Assignee: Indal Corporation, Bellevue, Wash.

[21] Appl. No.: 187,313

[22] Filed: Sep. 15, 1980

[51] Int. Cl.³ ............... G11B 31/00; G03B 31/00
[52] U.S. Cl. .................................. 360/80; 353/15; 353/26 A
[58] Field of Search ........... 360/80; 353/26 R, 26 A, 353/15, DIG. 2; 35/8 A

[56] References Cited

U.S. PATENT DOCUMENTS

| | | | |
|---|---|---|---|
| 3,944,348 | 3/1976 | Freudenschuss | 360/80 |
| 3,979,774 | 9/1976 | Chen et al. | 360/80 |
| 4,027,958 | 6/1977 | Shigeta et al. | 353/23 A |
| 4,075,668 | 2/1978 | Keach | 360/80 |
| 4,165,159 | 8/1979 | Landau et al. | 360/80 |

Primary Examiner—Alfred H. Eddleman
Attorney, Agent, or Firm—Seed, Berry, Vernon & Baynham

[57] ABSTRACT

A system for the control, selection and synchronization of the movement of magnetic tape and filmstrip in a film projection system which may include a sound program. Film advance is synchronized with the sound reproduction by means of recorded signals on the magnetic tape which unambiguously specify the filmstrip frame number appropriate to the magnetic tape sound program. Means are provided to allow the operator to rapidly access a particular filmstrip frame by specifying its number. When a sound program is included, the invention assures automatic synchronization of the sound program with the filmstrip frame.

15 Claims, 6 Drawing Figures

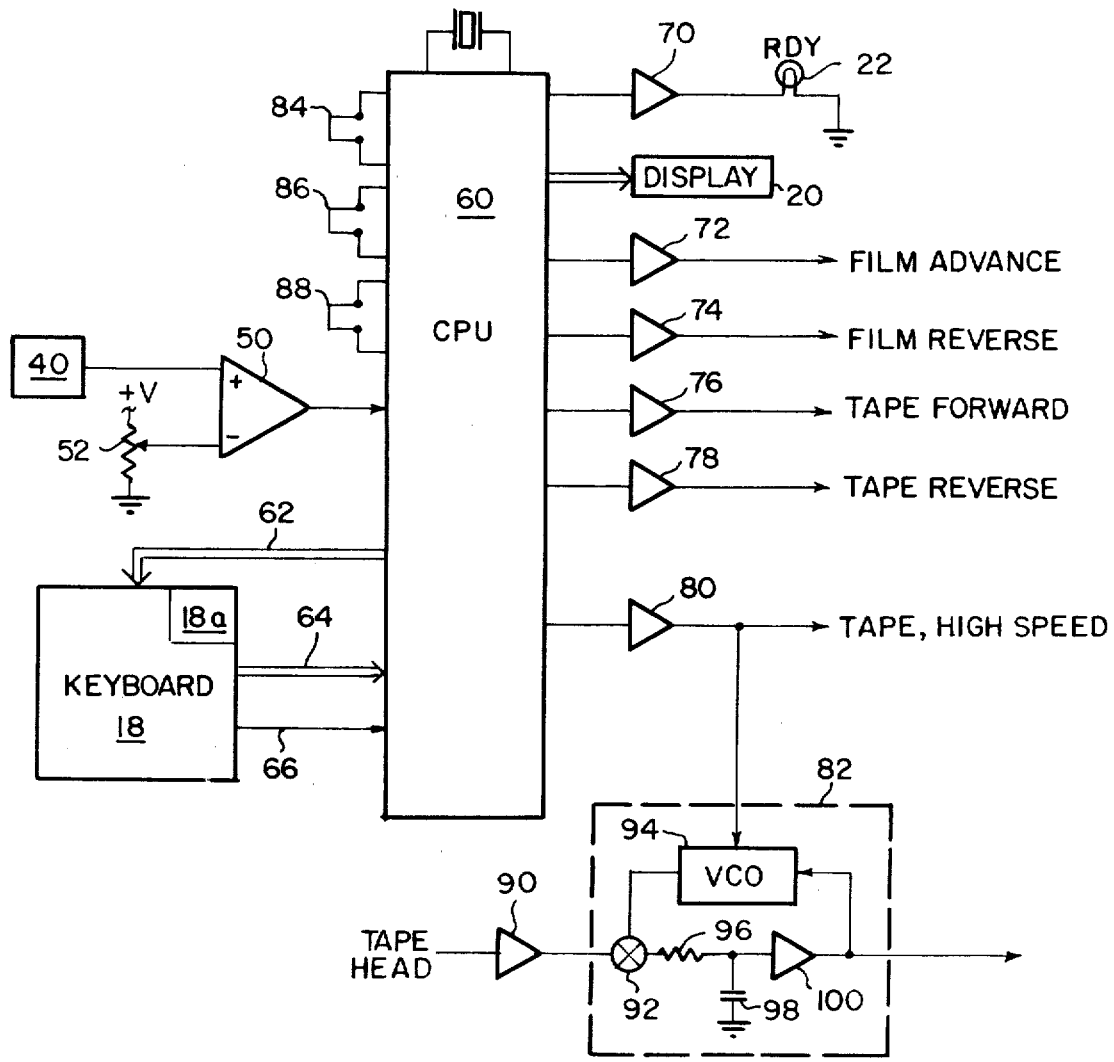
FIG. 3
FIG. 4
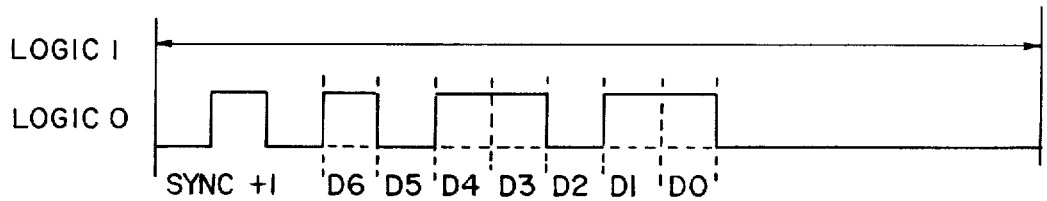

CONTROL SYSTEM FOR AUDIO-VISUAL PROJECTOR

BACKGROUND OF THE INVENTION

1. Field of the Invention

This invention relates to filmstrip projectors and, more particularly, to a system for assuring synchronization of audio and visual media, and for providing ease of access to particular media segments.

2. Description of the Prior Art

Audio-visual projectors which provide an integrated audio-visual program have become increasingly popular in industry as sales and instructional aids, and in schools as teaching aids. Such systems have had a number of shortcomings which have restricted their usefulnees by technically unskilled operators. Present systems typically use single-frequency tone bursts on a second magnetic tape track to generate a pulse which advances the filmstrip to the next frame to be viewed. Difficulties are often experienced in establishing synchronization of the video and audio media, and present art does not preclude a loss of synchronization due to electrical noise or imperfection in the magnetic tape media, such as dropouts. A loss of synchronization will continue through an entire program unless the operator recognizes and manually intervenes to correct the problem. Maneuvering of the media to synchronize may be difficult if the correlation between the sound program and the frame being viewed is not immediately apparent to the operator. Rapid location of a particular frame within the filmstrip requires continuous attention to the machine and the subsequent resynchronization of the magnetic tape with the filmstrip frame may be a formidable task.

SUMMARY OF THE INVENTION

It is the object of the invention to provide a reliable means of automatically synchronizing and assuring continued synchronization of the audio and visual media displayed in an audio-visual filmstrip projector.

It is another object of the invention to provide a means of detecting a specific filmstrip frame for use in establishing and assuring synchronization between the audio and visual media during operation.

It is still another object of the invention to allow an operator to either select a particular frame of the filmstrip, advance the filmstrip one frame at a time, rapidly advance the filmstrip, or stop the program.

It is a further object of the invention to measure the light intensity of each film frame image over the entire frame in a manner which does not degrade the quality of such image.

It is a still further object of the invention to provide a means of rapidly and automatically resynchronizing the integrated audio-visual program after implementation of an operator command has caused the filmstrip to advance beyond the respective audio program.

It is a still further object of the invention to provide a means of characterizing the system by means of wire jumpers to operate with filmstrip mechanisms which allow only forward motion or those which allow reversible motion, or magnetic tape configurations which allow only forward motion or those which allow reversible motion.

These and other objects of the invention are provided for by a system for detecting a particular filmstrip frame, controlling subsequent motion of the filmstrip or other photographic media while calculating the resultant filmstrip frame number. Means are provided for demodulating encoded frame number information from a second audio track on the magnetic tape in order to determine the number of the corresponding filmstrip frame number.

BRIEF DESCRIPTION OF THE FIGURES OF THE DRAWING

FIG. 3 is a block diagram and schematic of the control system for filmstrip projection.

FIG. 4 is a diagram indicating a data format which may be used in encoding frame numbers on the magnetic tape.

DETAILED DESCRIPTION OF THE INVENTION

Figure 1:
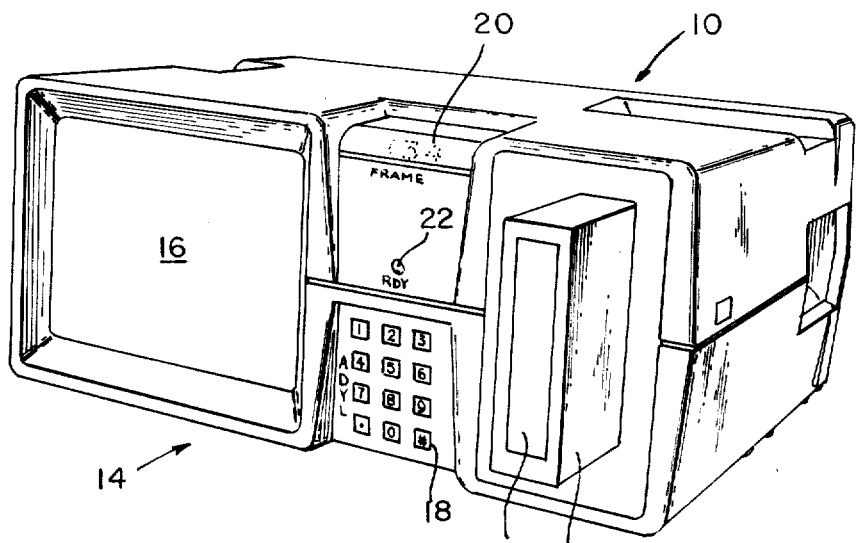
FIG. 1 is a view of a typical control panel connected to the control system for filmstrip projection.

The control system is adapted for use with an audio-visual projector of the type illustrated in FIG. 1. The projector 10 is housed in a case 12 having a front panel 14 containing a projection screen 16, a keyboard 18, a digital display 20, a "READY" indicator light 22 and a slot 24 for receiving a conventional audio-visual cassette 26. As explained in greater detail hereinafter, the keyboard 18 contains alpha numeric and control keys for controlling the operation of the projector 10. The digital display 20 indicates the film frame which is currently being projected onto the screen 16, and the READY indicator light 22 indicates that the keyboard 18 is ready to receive data or commands.

Figure 2A:
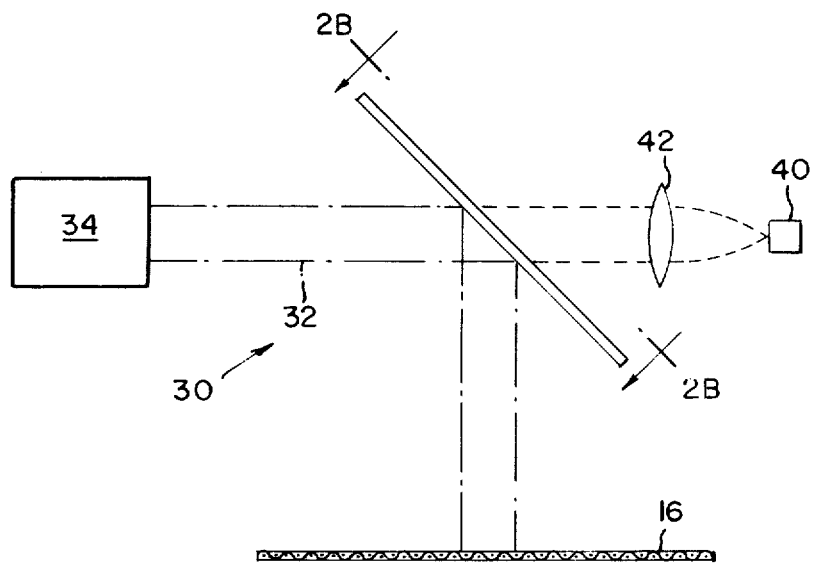
FIGS. 2a and 2b are isometric views of the optical sync frame detector.
Figure 2B:
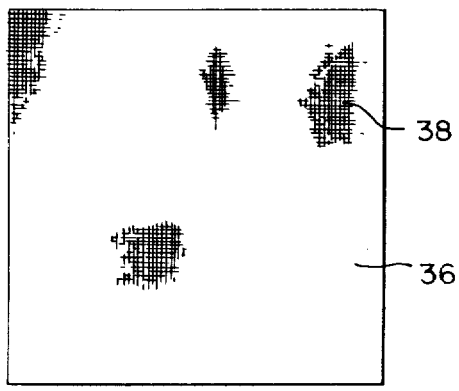

The control system synchronizes the filmstrip to the tape by locating a reference or "sync" frame which is more opaque than any of the other frames. A film frame intensity sensor, as illustrated in FIG. 2, is used to locate the sync frame. The sensor 30 receives the light rays 32 from a conventional projector 34, and a specially constructed mirror 36 reflects the rays onto the projection screen 16. The mirror 36 is scribed with a very fine cross-hatching pattern 38, as illustrated in FIG. 2B, which allows a small amount of light to pass through the mirror 36. The light passing through the mirror 36 is focused onto a photo sensor 40 by a conventional lens 42. Since the cross-hatching pattern 38 occupies only a small percentage of the mirror's area, the image is reflected onto the screen 16 without degradation. The mirror 36 is placed in the light path at a location where light rays are not focused into an image. Although an essentially rectangular cross-hatching pattern 38 is illustrated in FIG. 2B, it will be understood that other cross-hatching patterns may be used. It is most desirable, however, that the cross-hatching pattern 38 be substantially as large as the entire image so that the light striking the sensor 40 be representative of the intensity of the entire image.

The output of the light sensor 40 is applied to one terminal of a conventional comparator 50, while the other input to comparator 50 receives a reference voltage from a potentiometer 52. The potentiometer 52 is adjusted such that the output of the comparator 50 remains high for the normal level of illumination falling on the sensor 50 when film frames other than the sync frame are projected. As mentioned above, the sync frame is a frame on the filmstrip of highest density or a frame which is covered with an opaque or highly reflective material. When the sync frame is projected, the level of illumination falling on the sensor 40 becomes very low and the output of the comparator then goes low. The output logic level of the comparator 50 is applied to an input of a central processing unit 60 for processing according to a stored program of instructions, as explained hereinafter.

The keyboard 18 is connected directly to the central processing unit 60. Keyboard entries are detected by the central processing unit 10 through execution of a stored program which selectively applies a low logic level to one horizontal row of keys at a time through bus 62 while testing the output of the keyboard one column at a time through bus 64. In this manner, each of the keys is tested and detected, and the function of the key depressed is interpreted by the stored program of instructions in the central processing unit 60. A further feature of the preferred embodiment is the use of an interrupt input to the central processing unit 60 which allows the operator to interrupt the normal execution of the stored program by pressing the stop key 18A of the keyboard 18 which applies an appropriate logic signal to the interrupt input of the processing unit 60 through line 66.

An output of the central processing unit 60 is applied to an amplifier 70 which drives the READY indicator lamp 22 according to conditions sensed by the central processing unit 60 during execution of the stored program of instructions. In particular, the lamp 22 indicates the numeric data or a command may be entered through the keyboard 18.

Another output of the central processing unit 60 is applied to amplifier 72 to generate an output signal of sufficient amplitude and current to actuate a conventional filmstrip advance mechanism.

Another output of the central processing unit is applied to amplifier 74 to provide an output of signal of sufficient amplitude and current to actuate a filmstrip reverse mechanism which causes the filmstrip to move backwards by a single frame.

Another output of the central processing unit 60 is applied to an amplifier 76 to generate an output signal of sufficient amplitude and current to actuate a conventional magnetic tape drive motor or magnetic tape drive motor controller into a low-speed mode.

Another output of the central processing unit 60 is applied to an amplifier 78 which generates an output signal of sufficient amplitude and current to actuate a conventional magnetic tape drive motor controller which selects reverse motion of the magnetic tape media according to a stored program of instructions in the central processing unit 60.

Still another output of the central processing unit 60 is applied to an amplifier 80 which generates an output signal of sufficient amplitude and current to switch a conventional magnetic tape drive motor or magnetic tape drive motor controller into a high-speed mode. The output of this amplifier 80 is also applied to a tone demodulator 82 to allow the system to decode control tones when the tape is moving at a high rate of speed, as explained in greater detail hereinafter.

Three output ports of the central processing unit 60 apply BCD coded data to the display module 20. The display module 20 includes a conventional decoder driver which energizes conventional seven-segment, light-emitting diode arrays. The stored program of instructions executed by the central processing unit 60 provides appropriate BCD outputs according to the stored program and actuation of the keyboard 18. The outputs of the decoder driver cause selected segments of the display 20 to be illuminated in patterns which form numeric figures corresponding to the filmstrip frame numbers.

The audio-visual projector control system is adapted for use with projectors having a variety of features and capabilities. Some projectors are solely video units which are not capable of playing audio tapes. Others have audio capability, but the tape can move forwardly but not in reverse. Finally, some projectors are capable of switching film frames in reverse while others can only advance the film frames. In order to customize the control system to a specific projector, removable jumper wires 84,86,88 may be connected between appropriate terminals of the processing unit 60 to indicate the projector's inability to play tape, reverse wind tape, and reverse film, respectively.

An important feature of the invention is the ability to recognize control tones on the audio tape, regardless of whether the tape is moving forwardly in a high-speed or a low-speed mode. This feature is provided by the tone decoder 82, which utilizes a phase-lock loop to produce logic signals indicative of the frequency of control tones on the audio tape. Accordingly, the output of the tape head is boosted by amplifier 90 and applied to a conventional phase detector 92. The phase detector 92 produces an output signal which is proportional to the difference in phase between the signal at the output of amplifier 90 and the output of the conventional voltage-controlled oscillator 94. The output of the phase detector 92 passes through a low-pass filter consisting of resistor 96 and capacitor 98, and is applied to the input of an amplifier 100. As well understood by one skilled in the art, the phase-lock loop operates to cause the phase of the signal at the output of the voltage-controlled oscillator 94 to be equal to the phase of the signal at the output of the amplifier 90. Thus, as the frequency of the signal at the output of amplifier 90 varies, the frequency of the signal at the output of the voltage-controlled oscillator 94 varies accordingly; and, since the frequency of the signal at the output of the voltage-controlled oscillator is proportional to the voltage at the input to oscillator 94, the voltage at the output of amplifier 100 varies in accordance with the frequency of the audio signal from the tape head. In operation, the voltage-controlled oscillator 94 has a center frequency which is the frequency of the signal generated by the oscillator 94 when a signal is not being applied to the amplifier 90. The center frequency of the voltage-controlled oscillator 94 is altered by the logic level at the output of amplifier 80 in the tape high-speed mode, as explained in greater detail hereinafter.

Film frame identification data is placed on the audio tape in a 16-bit frame so that each portion of the audio tape is associated with a specific film frame. A logic "0" corresponds to an audio tone of one frequency; e.g., 2 kHz, while a logic "1" level corresponds to an audio tone of another frequency; e.g., 2.4 kHz. The 16-bit frame commences with a 2 kHz to 2.4 kHz transition which the detector 82 decodes to a logic "0" to logic "1" sync pulse. A 2 kHz period follows the sync pulse and seven identification frames, D6, D5 ... D0, identify the film frame corresponding to that portion of the audio tape. Thus the "1,0,1,1" frame illustrated in FIG.

4 identifies film frame 91. In practice, the frame identification numbers are arranged in some logical sequence, such as frame 000 as the sync frame, frames 001-254 as program frames, and frame 255 to identify the program stop point.

The frequency of the control tone as picked up by the tape head is directly proportional to the speed of the tape. In the normal tape-forward mode, the tape is operated at a speed which causes the control tones to be either 2 kHz or 2.4 kHz. However, in the high-speed tape mode, the tape moves forwardly at a speed which is substantially faster than the speed of the tape in the normal forward mode. For a speed increase of three, the control signals thus vary between 6 kHz and 7.2 kHz ($3 \times (2$ kHz-2.4 kHz)). It is apparent then that the operation of the decoder 82 must be changed since the audio tone, being greater than 2.4 kHz, would cause the output of amplifier 100 to be a logic "1" at all times. Accordingly, the output of amplifier 80 alters the center frequency of the voltage-controlled oscillator 94 from 2 kHz to 6 kHz so that a logic "0" at the output of amplifier 100 produces a 6 kHz signal at the output of oscillator 94 instead of the normal 2 kHz signal. When the signal applied to amplifier 90 rises to 7.2 kHz, the output of amplifier 100 transitions from logic "0" to logic "1" in the same manner as the 2 kHz to 2.4 kHz transition in the normal operating mode. The output of amplifier 100 thus generates the 16-bit frame identifying the film frame corresponding to each portion of the audio tape during both the normal tape-forward speed and the high-speed modes.

Figure 5:
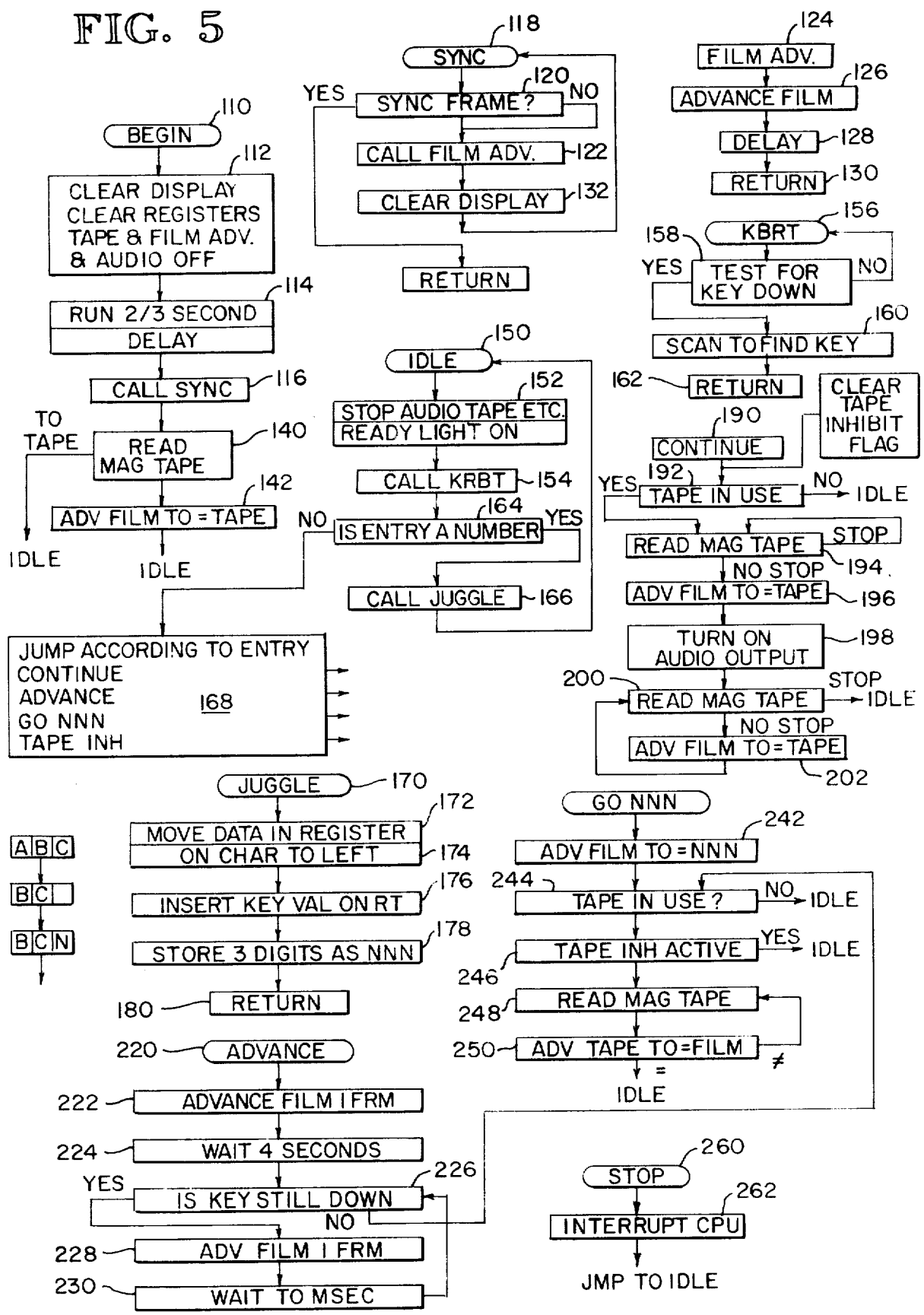
FIG. 5 is a flow chart of the program utilized by the central processing unit module for controlling the operation of the control system.

A flow chart of the program instructions executed by the processing unit 60 is illustrated in FIG. 5. The program begins at 110 by actuating the CLEAR key on the keyboard 18. The displays, registers, tape and film advance outputs are cleared or de-energized at 112, and the tape is then run for a short period of time at 114. The program then calls a "sync" sub-routine at 116, and the program then jumps to the sync sub-routine at 118. The purpose of the sync sub-routine is to advance the film to the opaque sync frame identified as frame 000. Thereafter, any other frame can be identified by counting the number of advances from the sync frame. The presence of the sync frame is tested at 120 and, if the sync frame is present, the program returns to the call block 116. If the sync frame is not present, a film advance sub-routine is called at 122. The program then jumps to a film advance sub-routine at 124 in which the film is advanced one frame at 126 and, after a short delay at 128 of sufficient duration to allow the film advance mechanism to operate, the program returns through 130 to the call film advance block 122. The displays are then cleared at 132, and the presence of the sync frame is once again tested at 120. In this manner, the film is advanced frame by frame until the sync frame is being projected.

After the film has been advanced to the sync frame, the film frame number corresponding to the present position of the magnetic tape is read at 140. If jumper wire 84 (FIG. 3) is present, the program branches to an "idle" sub-routine, explained in greater detail hereinafter. Otherwise, the film is advanced to the frame corresponding to the present position of the tape at 142 and the program jumps to the idle sub-routine. At this time then, the film has been advanced to the sync frame and then incremented a number of frames corresponding to the present position of the tape.

The program jumps to the idle sub-routine at 150 and, at 152, terminates movement of the audio tape and illuminates the READY light indicator 22 on the front panel 14 to indicate that data or program instructions may be entered in through the keyboard 18. A keyboard sub-routine is then called at 154, causing the program to jump to the keyboard sub-routine at 156. The keys of the keyboard 18 are then tested at 158, where it loops until a key has been pressed. The keyboard is then scanned at 160 to determine which key has been pressed, and the program returns to the call keyboard block 154 through 162. The program determines whether the key is a number key or a command key at 164. If the key is a number key, a "juggle" sub-routine is called at 166. Otherwise, one of the three sub-routines is called at 168, depending upon which key is actuated.

In the juggle sub-routine, starting at 170, the number corresponding to the actuated key is moved into a register at 172 and shifted one character to the left at 174. The selected key is examined at 176, and three digits are stored as "NNN" at 178 before returning to idle 150 through 180. At this time then, the frame number selected on the keyboard 18 is indicated in the display 20 and the frame number has been read into an internal register.

Upon returning to the idle sub-routine at 150, the READY light 152 is once again illuminated and the program jumps to one of three sub-routines at 168. If the "continue" sub-routine is selected, the program jumps to 190, at which time the tape-inhibit flag, which may have been set by actuating the NO TAPE key, is cleared. The program determines whether a tape is being used in the audio-visual device by examining at 192 for the presence of the NO TAPE jumper wire 84. If the audio-visual device is not equipped to handle tape, the program jumps back to the idle sub-routine at 150. Otherwise, the frame number of the magnetic tape is read at 194 and, if the portion of the magnetic tape corresponding to the STOP frame is not present, the film is advanced at 196 to equal the film frame number identified by the portion of tape being played. Thus, as the tape continues to move forwardly, it sequentially calls for additional film frames, causing the film to be advanced accordingly. The audio output is turned on at 198 so that the audio program on the tape is applied to a speaker. The film frame numbers are continuously read on the magnetic tape at 200 and, if the STOP frame number is not detected, the program continuously loops through block 202, in which the film is advanced to equal the film frame number on the tape until the STOP frame is detected at 200, thereby jumping the program to idle at 150.

If, instead of actuating the "continue" key, the "advance" key is actuated, the program jumps from 168 to the advance sub-routine at 220. Thereafter, the film is advanced one frame at 222 and, after a short delay at 224 of short duration, the keyboard 18 is examined at 226 to determine if a key is still being actuated. If not, the program branches to a different sub-routine. Otherwise, the film is advanced an additional frame at 228 and, after a short delay at 230, the advance key is once again examined at 226. Thus, momentarily pressing the advance key advances the film one frame. Thereafter, the film will continuously advance frame by frame if the advance key continues to be pressed.

It will be remembered that in the juggle sub-routine entered by selecting a number key on the keyboard 18, a three-digit number corresponding to a selected film frame is entered into a register. The film and tape are moved to this frame by selecting a "go-NNN" sub-routine at 168, thereby causing the program to jump to the sub-routine at 240. The film is first advanced to the selected film frame at 242. The presence of the NO TAPE jumper is checked at 244 and, if present, the program jumps to the idle sub-routine. Otherwise, the actuation of the tape-inhibit key is checked at 246 and, if it has been pressed, the program also jumps to the idle sub-routine. Otherwise, the film frame indicated by the magnetic tape is read at 248 and the tape is then advanced at 250 until the portion of the tape corresponds to the film frame. The program then jumps to the idle sub-routine.

As explained above, in the advance sub-routine, the film either is advanced one frame at a time or, in a rapid-advance mode selected by continuously depressing the advance key, a large number of frames. Release of the advance key is ultimately detected at 226, causing the program to loop to the tape-in-use block 244 of the go-NNN sub-routine. Thereafter, the magnetic tape is advanced to the portion corresponding to the selected film frame.

At any point in the program as described above, the STOP key of the keyboard 18 may be actuated. The STOP key is connected directly to the interrupt input of the central processing unit 60 through line 66, thereby jumping the program to a stop sub-routine at 260. Thereafter, the central processing unit is interrupted at 262 and the program then jumps to the idle sub-routine at 150 to await further operation under control of the keyboard 18.

It is thus seen that the control system allows the audio-visual projector to operate in a variety of modes in which the large number of functions are performed. Additionally, synchronization errors are automatically corrected to ensure trouble-free operation.

I claim:

1. A control system for an audio-visual device for sequentially projecting a plurality of frames of a filmstrip responsive to actuation of a film advance mechanism and for presenting an audio program recorded on an audio tape including spaced-apart coded signals each of which uniquely identifies a respective frame of said filmstrip so that each portion of said tape is associated with a respective film frame, said control system comprising:
   sync frame detector means for generating a reset signal responsive to projection of a predetermined sync frame;
   film frame counter means incremented responsive to actuation of said film advance mechanism and reset by the reset signal from said sync frame detector means such that a digital word at the output of said counter identify the frame being projected;
   tape decoder means receiving the coded signals on said audio tape and generating a digital word indicative of the film frame associated with the coded signal last appearing in said audio program; and
   comparator means for actuating said advance mechanism until the digital word at the output of said film frame counter means is equal to the digital word at the output of said tape decoder means whereby the frames of said filmstrip are advanced in synchronism with said audio program.

2. The control system of claim 1 wherein said coded signals are multi-frequency control tones recorded on said audio tape, and wherein said tape decoder means further includes a detector system for recognizing said control tones as the playing speed of said audio tape varies from a low speed to a high speed responsive to a high-speed command signal, said system comprising frequency discriminator means for generating an output voltage having a magnitude which is proportional to the difference in frequency between said audio program and a reference frequency, said reference frequency being shifted from a low-speed reference frequency when said tape is playing at said low speed to a high-speed reference frequency when said tape is playing at said high speed, the ratio between said low-speed reference frequency and said high-speed reference frequency being substantially equal to the ratio between said low speed and said high speed so that the voltages generated by said frequency discriminator means responsive to said control tones are constant as the playing speed of said audio tape changes between said high and low speeds.

3. The control system of claim 2 wherein said control tones are recorded as binary coded frequency shift keyed signals spaced apart on said audio tape, each of said signals corresponding to a respective frame of said filmstrip so that each portion of said tape is associated with a respective film frame.

4. The control system of claim 2 wherein said frequency discriminator means comprises a phase-lock loop including voltage-controlled oscillator means for generating an output signal having a frequency which deviates from a center frequency responsive to a voltage applied to its input, and phase detector means for applying a voltage to the input of said voltage-controlled oscillator means which is proportional to the difference in phase between said audio program and the output signal from said voltage-controlled oscillator means, said system further including means for shifting the center frequency of said voltage-controlled oscillator means from one frequency to another in proportion to the shift in playing speed of said tape from said low speed to said high speed.

5. The system of claim 1 wherein said sync frame has a light transmissibility which differs from the light transmissibility of all other frames, and wherein said sync frame detector means comprises a mirror receiving an unfocused image from each frame as it is projected and reflecting said image to where it can be viewed, a relatively small portion of said mirror spread apart over a relatively wide area being transparent to allow a small portion of said image to pass through said mirror onto light-sensing means for generating a signal indicative of the intensity of said image, whereby a signal indicative of a relatively low intensity identifies said sync frame.

6. The sync frame detector means of claim 5 wherein said mirror is formed by a transparent sheet having a thin reflective coating, said coating being scribed with thin, spaced-apart lines substantially throughout the entire area of said mirror.

7. The system of claim 1, further including keyboard means for entering data indicative of a predetermined film frame and control means responsive to said keyboard for advancing said audio tape to the portion of said audio program corresponding to said frame and for advancing said filmstrip to the predetermined frame.

8. The system of claim 7, further including display means for providing a visual indication of said predetermined film frame.

9. The system of claim 1, further including means for adapting said control system to audio-visual devices having varying capabilities comprising a plurality of removable conductors connected between respective circuit nodes, each corresponding to a predetermined capability.

10. In an audio visual device for presenting an audio program recorded on an audio tape contained in an audio section of an audio-visual cassette and for sequentially projecting a plurality of frames of a filmstrip contained in a visual section of said audio-visual cassette, the frames of said filmstrip being incremented by an advance mechanism which is actuated by multi-frequency control tones on said audio program, a detector system for recognizing said control tones as the playing speed of said audio tape varies from a low speed to a high speed responsive to a high-speed command signal, said system comprising frequency discriminator means for generating an output voltage having a magnitude which is proportional to the difference in frequency between said audio program and a reference frequency, said reference frequency being shifted from a low-speed reference frequency when said tape is playing at said low speed to a high-speed reference frequency when said tape is playing at said high speed, the ratio between said low speed reference frequency and said high-speed reference frequency being substantially equal to the ratio between said low speed and said high speed so that the voltages generated by said frequency discriminator means responsive to said control tones are constant as the playing speed of said audio tape changes between said high and low speeds.

11. The detector system of claim 10 wherein said control tones are recorded as binary coded frequency shift keyed signals spaced apart on said audio tape, each of said signals corresponding to a respective frame of said filmstrip so that each portion of said tape is associated with a respective film frame.

12. The detector system of claim 11, further including means for uniquely identifying each frame of said filmstrip, and wherein said advance mechanism includes means for advancing said filmstrip to the frame associated with the binary coded signal last generated by said frequency discriminator means.

13. The detector system of claim 10 wherein said frequency discriminator means comprises a phase-lock loop including voltage-controlled oscillator means for generating an output signal having a frequency which deviates from a center frequency responsive to a voltage applied to its input, and phase detector means for applying a voltage to the input of said voltage-controlled oscillator means which is proportional to the difference in phase between said audio program and the output signal from said voltage-controlled oscillator means, said system further including means for shifting the center frequency of said voltage-controlled oscillator means from one frequency to another in proportion to the shift in playing speed of said tape from said low speed to said high speed.

14. In a device for sequentially projecting a plurality of frames of a filmstrip, one of which is a sync frame having a light transmissibility which differs from the light transmissibility of all other frames, said device further including sync frame detector means for identifying said sync frame, comprising a mirror receiving an unfocused image from each frame as it is projected and reflecting said image to where it can be viewed, a relatively small portion of said mirror spread apart over a relatively wide area being light transmissive to allow a small portion of said image to pass through said mirror onto light-receiving means for generating a signal indicative of the intensity of said image, whereby a signal indicative of a relatively low intensity identifies said sync frame.

15. The sync frame detector means of claim 14 wherein said mirror is formed by a transparent sheet having a thin reflective coating, said coating being scribed with thin, spaced-apart lines substantially throughout the entire area of said mirror.

* * * * *